US 9,816,581 B2

(12) United States Patent
Ueki

(10) Patent No.: US 9,816,581 B2
(45) Date of Patent: Nov. 14, 2017

(54) VIBRATION PREVENTION DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/900,868

(22) PCT Filed: Jul. 14, 2014

(86) PCT No.: PCT/JP2014/068698
§ 371 (c)(1),
(2) Date: Dec. 22, 2015

(87) PCT Pub. No.: WO2015/012145
PCT Pub. Date: Jan. 29, 2015

(65) Prior Publication Data
US 2016/0160956 A1    Jun. 9, 2016

(30) Foreign Application Priority Data
Jul. 25, 2013  (JP) .................................. 2013-154956

(51) Int. Cl.
F16F 13/10    (2006.01)
B60K 5/12    (2006.01)

(52) U.S. Cl.
CPC .......... F16F 13/107 (2013.01); B60K 5/1208 (2013.01); F16F 2222/12 (2013.01)

(58) Field of Classification Search
CPC .. F16F 13/08; F16F 13/10; F16F 13/26; F16F 13/105; F16F 13/16; F16F 13/107; F16F 9/34; F16F 2230/00; B60K 5/1208
(Continued)

(56) References Cited

U.S. PATENT DOCUMENTS 3,220,517 A * 11/1965 Lorenz .................... F15C 1/02
                                                        188/318
4,681,306 A *  7/1987 Hofmann ............. F16F 13/262
                                                        188/139
(Continued)

FOREIGN PATENT DOCUMENTS

DE    3731479 A1 *  4/1989 ............ F16F 13/107
EP    0209682 A2    1/1987
(Continued)

OTHER PUBLICATIONS

International Search Report for PCT/JP2014/068698 dated Sep. 9, 2014.

Primary Examiner — Robert A Siconolfi
Assistant Examiner — San Aung
(74) Attorney, Agent, or Firm — Sughrue Mion, PLLC

(57) ABSTRACT

A partition member (16) is provided with a whirl chamber unit (31a, 31b) that causes two liquid chambers to communicate with each other, the whirl chamber unit (31a, 31b) includes a whirl chamber (33a, 33b) that whirls a liquid flowing therein, a rectification passage (34a, 34b) that causes one liquid chamber to communicate with the whirl chamber (33a, 33b) and that is opened in the whirl chamber (33a, 33b) in a circumferential direction of the whirl chamber (33a, 33b), and a communication hole (32a, 32b) that causes the other liquid chamber to communicate with the whirl chamber (33a, 33b). The whirl chamber (33a, 33b) forms a whirl flow of a liquid depending on a flow rate of the liquid flowing from the rectification passage (34a, 34b) and causes the liquid to flow from the communication hole (32a, 32b). The whirl chamber unit (31a, 31b) includes a plurality of first whirl chamber units (31a) in which a first whirl chamber (33a) as the whirl chamber communicates with the first liquid chamber (14) via a first rectification passage (34a) as the rectification passage and communicates with the (Continued)

second liquid chamber (15) via a first communication hole (32a) as the communication hole. The vibration prevention device (10) can exhibit damping characteristics with high accuracy.

7 Claims, 11 Drawing Sheets

(58) Field of Classification Search
USPC .............................. 267/140.13, 35; 248/638
See application file for complete search history.

(56) References Cited

U.S. PATENT DOCUMENTS

| | | | |
|---|---|---|---|
| 4,739,962 A | 4/1988 | Morita et al. | |
| 4,893,797 A * | 1/1990 | Le Fol | F16F 13/18 180/312 |
| 6,056,279 A * | 5/2000 | Lee | F16F 13/10 180/300 |
| 2002/0089103 A1 | 7/2002 | Gedenk | |
| 2013/0015614 A1 * | 1/2013 | Bradshaw | F16F 13/16 267/140.13 |

FOREIGN PATENT DOCUMENTS

| | | |
|---|---|---|
| EP | 0306752 A2 | 3/1989 |
| EP | 1346166 A1 | 9/2003 |
| EP | 2221503 A1 | 8/2010 |
| JP | 57-118921 A | 7/1982 |
| JP | 60-73147 A | 4/1985 |
| JP | 62-28543 A | 2/1987 |
| JP | 2004-516435 A | 6/2004 |
| JP | 2007-120598 A | 5/2007 |

* cited by examiner

VIBRATION PREVENTION DEVICE

CROSS REFERENCE TO RELATED APPLICATIONS

This application is a National Stage of International Application No. PCT/JP2014/068698 filed Jul. 14, 2014, claiming priority based on Japanese Patent Application No. 2013-154956 filed Jul. 25, 2013, the contents of all of which are incorporated herein by reference in their entirety.

TECHNICAL FIELD

The present invention relates to a vibration prevention device that is applied to, for example, an automobile or industrial machinery and that absorbs and damps vibrations of a vibration source such as an engine.

BACKGROUND ART

For example, a configuration described in Patent Document 1 is known as such a type of vibration prevention device. This vibration prevention device includes a tubular first attachment member that is connected to one of a vibration source and a vibration receiver, a second attachment member that is connected to the other thereof, an elastic body that connects two attachment members to each other, and a partition member that partitions a liquid chamber in the first attachment member having a liquid enclosed therein into a first liquid chamber and a second liquid chamber. The vibration prevention device also includes a first limiting passage and a second limiting passage that cause the two liquid chambers to communicate with each other, a cylinder chamber that is disposed between the two liquid chambers, and a plunger member that is disposed to be movable between an opened position and a closed position in the cylinder chamber.

A plurality of types of vibration having different frequencies such as idle vibration or shake vibration are input to the vibration prevention device. Accordingly, in the vibration prevention device, resonance frequencies of the first limiting passage and the second limiting passage are set (tuned) to frequencies of the different types of vibration. By moving the plunger member between the opened position and the closed position depending on the frequency of input vibration, a limiting passage in which a liquid flows is switched between the first limiting passage and the second limiting passage.

CITATION LIST

Patent Document

[Patent Document 1]
Japanese Unexamined Patent Application, First Publication No. 2007-120598

SUMMARY OF INVENTION

Technical Problem

Here, the inventor of this application has studied intensively to obtain knowledge with which it is possible to simplify a structure and to facilitate manufacturing by employing a configuration in which a whirl chamber unit communicating with two liquid chambers is provided as the partition member.

In this vibration prevention device, the whirl chamber unit includes a whirl chamber, a rectification passage, and a communication hole. The whirl chamber whirls a liquid flowing therein. The rectification passage causes one liquid chamber of the two liquid chambers to communicate with the whirl chamber and is opened in the whirl chamber in the circumferential direction of the whirl chamber. The communication hole causes the other liquid chamber of the two liquid chambers to communicate with the whirl chamber. The whirl chamber is configured to form a whirl flow of a liquid depending on a flow rate of the liquid flowing from the rectification passage and to cause the liquid to flow from the communication hole.

When vibration is input to the vibration prevention device, the liquid flows between the two liquid chambers via the whirl chamber unit. At this time, when the flow rate of the liquid flowing from the rectification passage to the whirl chamber is increased enough and a whirl flow of the liquid is formed in the whirl chamber, the vibration is absorbed and damped. Accordingly, in the vibration prevention device, the whirl chamber unit is designed so as to form a whirl flow of the liquid in the whirl chamber to absorb and damp desired vibration when the desired vibration is input to the vibration prevention device.

In designing a whirl chamber unit, a specific shape of the whirl chamber unit is designed so as to form a whirl flow of a liquid in the whirl chamber when the desired vibration is input. Thereafter, the size of the whirl chamber is changed, for example, depending on degrees of damping and absorption. When the size of the whirl chamber unit is changed, the shape of an opening of the rectification passage which is opened in the liquid chamber is enlarged or reduced into another shape similar to this shape, and then the inner diameter of the whirl chamber is enlarged or reduced depending on a similarity ratio of the opening. Accordingly, it is possible to absorb and damp the same types of vibration without depending on the size of the whirl chamber unit.

However, when the desired vibration having a small amplitude is input to the vibration prevention device, it is difficult to whirl the liquid in the whirl chamber and there is a possibility that damping characteristics of the vibration prevention device will not be accurately exhibited.

The present invention is made in consideration of the above-mentioned circumstances and an object thereof is to provide a vibration prevention device that can exhibit damping characteristic with high accuracy.

Solution to Problem

In order to achieve the above-mentioned object, the present invention employs the following means.

According to the present invention, there is provided a vibration prevention device including: a first attachment member having a tubular shape that is connected to one of a vibration source and a vibration receiver and a second attachment member that is connected to the other thereof; an elastic body that connects two attachment members; and a partition member that partitions a liquid chamber in the first attachment member having a liquid enclosed therein into a first liquid chamber and a second liquid chamber. At least one of the first liquid chamber and the second liquid chamber has the elastic body as a part of a wall surface thereof. The partition member is provided with a whirl chamber unit that causes the two liquid chambers to communicate with each other. The whirl chamber unit includes a whirl chamber that whirls a liquid flowing therein, a rectification passage that causes one liquid chamber of the two liquid chambers to communicate with the whirl chamber and that is opened in the whirl chamber in a circumferential direction of the whirl chamber, and a communication hole that causes the other liquid chamber of the two liquid chambers to communicate with the whirl chamber. The whirl chamber forms a whirl flow of the liquid depending on a flow rate of the liquid flowing from the rectification passage and causes the liquid to flow from the communication hole. The whirl chamber unit includes a plurality of first whirl chamber units in which a first whirl chamber as the whirl chamber communicates with the first liquid chamber via a first rectification passage as the rectification passage and communicates with the second liquid chamber via a first communication hole as the communication hole.

According to this configuration, the first whirl chamber units are designed so as to absorb and damp the desired vibration using the plurality of first whirl chamber units, when desired vibration is input.

In the vibration prevention device, since the whirl chamber unit includes a plurality of first whirl chamber units, it is possible to suppress the sizes of the openings opened in the first liquid chamber in the rectification passages of the plurality of first whirl chamber units so as to be small and to secure the total opening area of the openings to be equal to the opening area of the opening of the rectification passage when only a single first whirl chamber unit is disposed.

Since the sizes of the openings of the rectification passages of the plurality of first whirl chamber units can be suppressed to be small as described above, it is possible to suppress the volumes of the whirl chambers of the plurality of first whirl chamber units to be small. Accordingly, it is possible to set the total volume of the whirl chambers to be smaller than the volume of the whirl chamber when only a single first whirl chamber unit is disposed.

As a result, according to the vibration prevention device, it is possible to secure the opening area of the openings of the rectification passages to be equivalent and to decrease the volume of the whirl chambers, as the whole of the plurality of first whirl chamber units, in comparison with a case in which only a single first whirl chamber unit is disposed.

In this way, since the opening area of the openings of the rectification passages can be secured to be equivalent as a whole of the plurality of first whirl chamber units, it is possible to damp and absorb vibration to the same extent as the case in which only a single first whirl chamber unit is disposed even when the volume of the whirl chambers is small.

Since the volume of the whirl chambers can be decreased as a whole of the plurality of first whirl chamber units as described above, it is possible to whirl a liquid in the whirl chambers of the first whirl chamber units more sensitively than a case in which only a single whirl chamber unit is disposed, when the desired vibration having a small amplitude is input. Accordingly, it is possible to easily absorb and damp vibration and thus to exhibit damping characteristics of the vibration prevention device.

The partition member may be provided with a limiting passage that causes the two liquid chambers to communicate with each other and of which a resonance frequency is set to be equal to a first vibration frequency, and a resonance frequency of the rectification passage may be set to be equal to a second vibration frequency higher than the first vibration frequency.

According to this configuration, when a first vibration is input, a large amount of liquid flows into the first whirl chambers per unit time, for example, depending on the amplitude of the first vibration or the like. At this time, for example, since a flow is formed to whirl in the first whirl chamber, by an inertial force of a liquid flowing therein and this flow is developed into a whirl, flow resistance between the two liquid chambers via the first whirl chamber unit increases. Accordingly, the liquid preferentially flows between the two liquid chambers via the limiting passage and resonance occurs in the limiting passage to absorb and damp the first vibration.

On the other hand, when a second vibration is input, a small amount of liquid flows into the first whirl chamber per unit time depending on the amplitude of the second vibration or the like and thus a whirl flow in the first whirl chamber is not satisfactorily developed by the liquid flowing therein, thereby suppressing the flow resistance between the two liquid chambers via the first whirl chamber unit to be low. Accordingly, the liquid can be made to actively flow in the first whirl chamber unit and resonance occurs in the first rectification passage to absorb and damp the second vibration.

As described above, by disposing the whirl chamber unit instead of the plunger member as in the related art, it is possible to absorb and damp both the first vibration and the second vibration having different frequencies and thus to achieve simplification in the structure of the vibration prevention device and facilitation of manufacturing.

The partition member may partition the liquid chamber in an axial direction of the first attachment member, and an axis of the whirl chamber may extend along an intersection plane intersecting the axis of the first attachment member.

In this case, since the axis of the whirl chamber extends along the intersection plane, it is possible to easily form a large number of whirl chamber units in the partition member and thus to enhance space efficiency of the vibration prevention device.

The axis of the whirl chamber may extend in a circumferential direction of the first attachment member, and a plurality of the whirl chamber units may be arranged in the circumferential direction of the first attachment member.

In this case, since a plurality of whirl chamber units are arranged in the circumferential direction of the first attachment member, it is possible to easily form a larger number of whirl chamber units in the partition member and thus to further enhance space efficiency of the vibration prevention device.

The partition member may be provided with a whirl chamber member having the whirl chamber unit formed therein, the whirl chamber member may be divided in the axial direction of the first attachment member by a dividing plane extending to intersect the axis of the first attachment member, the dividing plane may divide the whirl chambers of all the whirl chamber units in the axial direction of the first attachment member, and the rectification passage may extend in the axial direction of the first attachment member and be opened on an end face of the partition member facing the outside in the axial direction of the first attachment member.

In this case, the dividing plane divides the whirl chambers in the axial direction of the first attachment member and the rectification passages extends in the axial direction of the first attachment member and is opened in the end face of the partition member. Accordingly, when divided bodies into which the whirl chamber member is divided by the dividing plane are formed using a mold, the mold can be easily released from the divided bodies in the axial direction of the first attachment member and it is possible to simply form the vibration prevention device.

The communication hole may be opened into the whirl chamber from an end face of a wall surface of the whirl chamber facing an axial direction of the whirl chamber.

In this case, since the communication hole is opened into the whirl chamber from the end face of the whirl chamber, it is possible to stably generate a whirl flow of a liquid and thus to effectively damp and absorb vibration.

The communication hole may be disposed coaxial with the axis of the whirl chamber.

In this case, since the communication hole is disposed coaxial with the axis of the whirl chamber, it is possible to secure the length in the whirl direction of the whirl flow of a liquid formed in the whirl chamber to be large and to easily cause the liquid to stay in the whirl chamber, thereby more effectively damping and absorbing vibration.

The whirl chamber unit may include a plurality of second whirl chamber units in which a second whirl chamber as the whirl chamber communicates with the second liquid chamber via a second rectification passage as the rectification passage and communicates with the first liquid chamber via a second communication hole as the communication hole.

In this case, the whirl chamber unit includes the first whirl chamber unit and the second whirl chamber unit. Accordingly, it is possible to absorb and damp vibration by causing the liquid flowing from the first liquid chamber to the second liquid chamber to flow in the first whirl chamber unit, and it is possible to absorb and damp vibrations by causing the liquid flowing from the second liquid chamber to the first liquid chamber to flow in the second whirl chamber unit, thereby effectively absorbing and damping vibration.

Advantageous Effects of Invention

According to the vibration prevention device of the present invention, it is possible to exhibit damping characteristics with high accuracy.

DESCRIPTION OF EMBODIMENTS

First Embodiment

Hereinafter, a vibration prevention device according to a first embodiment of the present invention will be described with reference to FIGS. 1 to 7.

Figure 1:
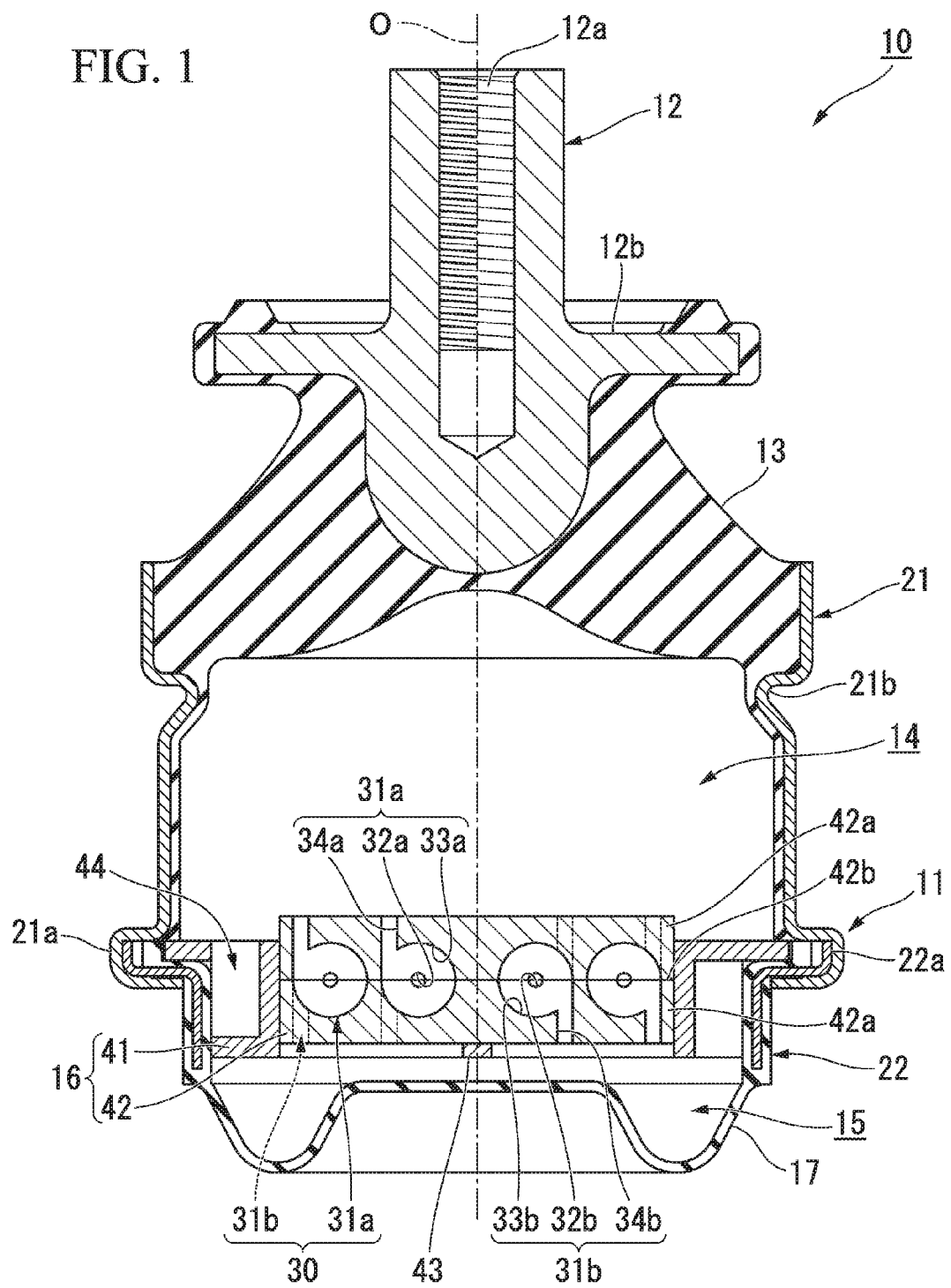
FIG. 1 is a longitudinal-sectional view of a vibration prevention device according to a first embodiment of the present invention.

As illustrated in FIG. 1, the vibration prevention device 10 includes a first attachment member 11 having a tubular shape that is connected to one of a vibration source and a vibration receiver, a second attachment member 12 that is connected to the other thereof, an elastic body 13 that connects two attachment members 11 and 12 to each other, and a partition member 16 that partitions a liquid chamber in the first attachment member 11 in which a liquid is enclosed into a primary liquid chamber (first liquid chamber) 14 having the elastic body 13 as a part of a wall surface thereof and a secondary liquid chamber (second liquid chamber) 15.

In the example illustrated in the drawing, the second attachment member 12 is formed in a pillar-like shape, the elastic body 13 is formed in a tubular shape, and the first attachment member 11, the second attachment member 12, and the elastic body 13 are arranged to be coaxial with a common axis. Hereinafter, the common axis is referred to as an axis O (the axis of the first attachment member), the primary liquid chamber 14 side along the direction of axis O (the axial direction of the first attachment member) is referred to as one side, and the secondary liquid chamber 15 side is referred to as the other side. A direction perpendicular to the axis O is defined as a radial direction (the radial direction of the first attachment member), and a direction circling around the axis O is defined as a circumferential direction (the circumferential direction of the first attachment member).

When the vibration prevention device 10 is mounted in, for example, an automobile, the second attachment member 12 is connected to an engine as the vibration source and the first attachment member 11 is connected to a vehicle body as the vibration receiver via a bracket (not illustrated) to suppress the transmission of vibrations of the engine to the vehicle body. The vibration prevention device 10 is of a liquid enclosure type in which a liquid such as ethylene glycol, water, or silicone oil is enclosed in the liquid chamber of the first attachment member 11.

The first attachment member 11 includes an one-side outer tubular body 21 located on one side along the direction of the axis O and an other-side outer tubular body 22 located on the other side along the direction of the axis O.

A one-side end of the one-side outer tubular body 21 is liquid-tightly connected to the elastic body 13 and thus a one-side opening of the one-side outer tubular body 21 is closed by the elastic body 13. The other-side end 21a of the one-side outer tubular body 21 is formed to have a diameter larger than those of the other portions. The inside of the one-side outer tubular body 21 serves as the primary liquid chamber 14. In the one-side outer tubular body 21, an annular groove 21b extending continuously over the entire circumference is formed in a portion continuous from the other side to the portion connected to the elastic body 13.

The other-side end of the other-side outer tubular body 22 is liquid-tightly connected to a diaphragm 17, and the other-side opening of the other-side outer tubular body 22 is closed by the diaphragm 17. A one-side end 22a of the other-side outer tubular body 22 is formed to have a larger diameter than those of the other portions and is fitted into the other-side end 21a of the one-side outer tubular body 21. A partition member 16 is fitted into the other-side outer tubular body 22, and the secondary liquid chamber 15 is disposed between the partition member 16 and the diaphragm 17. The substantially entire range of the other-side outer tubular body 22 is covered with a rubber membrane integrally formed with the diaphragm 17.

A female screw portion 12a is formed in an end face on one side of the second attachment member 12 to be coaxial with the axis O. The second attachment member 12 protrudes to one side from the first attachment member 11. A flange portion 12b protruding to the outside in the radial direction and extending continuously over the entire circumference is formed in the second attachment member 12. The flange portion 12b is separated to the other side from an edge on one side of the first attachment member 11.

The elastic body 13 is formed of an elastically-deformable material such as rubber and has a tubular shape in which the diameter gradually increases from one side to the other side. The one-side end of the elastic body 13 is connected to the second attachment member 12, and the other-side end thereof is connected to the first attachment member 11. The substantially entire range of the inner circumferential surface of the one-side outer tubular body 21 of the first attachment member 11 is covered with a rubber membrane integrally formed with the elastic body 13.

The partition member 16 partitions the liquid chamber in the direction of the axis O. The partition member 16 includes an attachment member 41 and a whirl chamber member 42. The attachment member 41 is attached to the first attachment member 11. The attachment member 41 is formed in an annular shape coaxial with the axis O and is fitted into the other-side outer tubular body 22. A support member 43 is disposed at the other-side end of the attachment member 41. The support member 43 is formed in a cross shape in a plan view by which the vibration prevention device 10 is viewed from the direction of the axis O, and the end of the support member 43 is connected to the inner circumferential surface of the attachment member 41. The whirl chamber member 42 is liquid-tightly fitted into the attachment member 41. The whirl chamber member 42 is supported from the other side by the support member 43.

The partition member 16 includes whirl chamber units 31a and 31b communicating with both liquid chambers 14 and 15 and a limiting passage 44. As illustrated in FIGS. 1 to 4, the whirl chamber units 31a and 31b include whirl chambers 33a and 33b, rectification passages 34a and 34b, and communication holes 32a and 32b.

Figure 3:
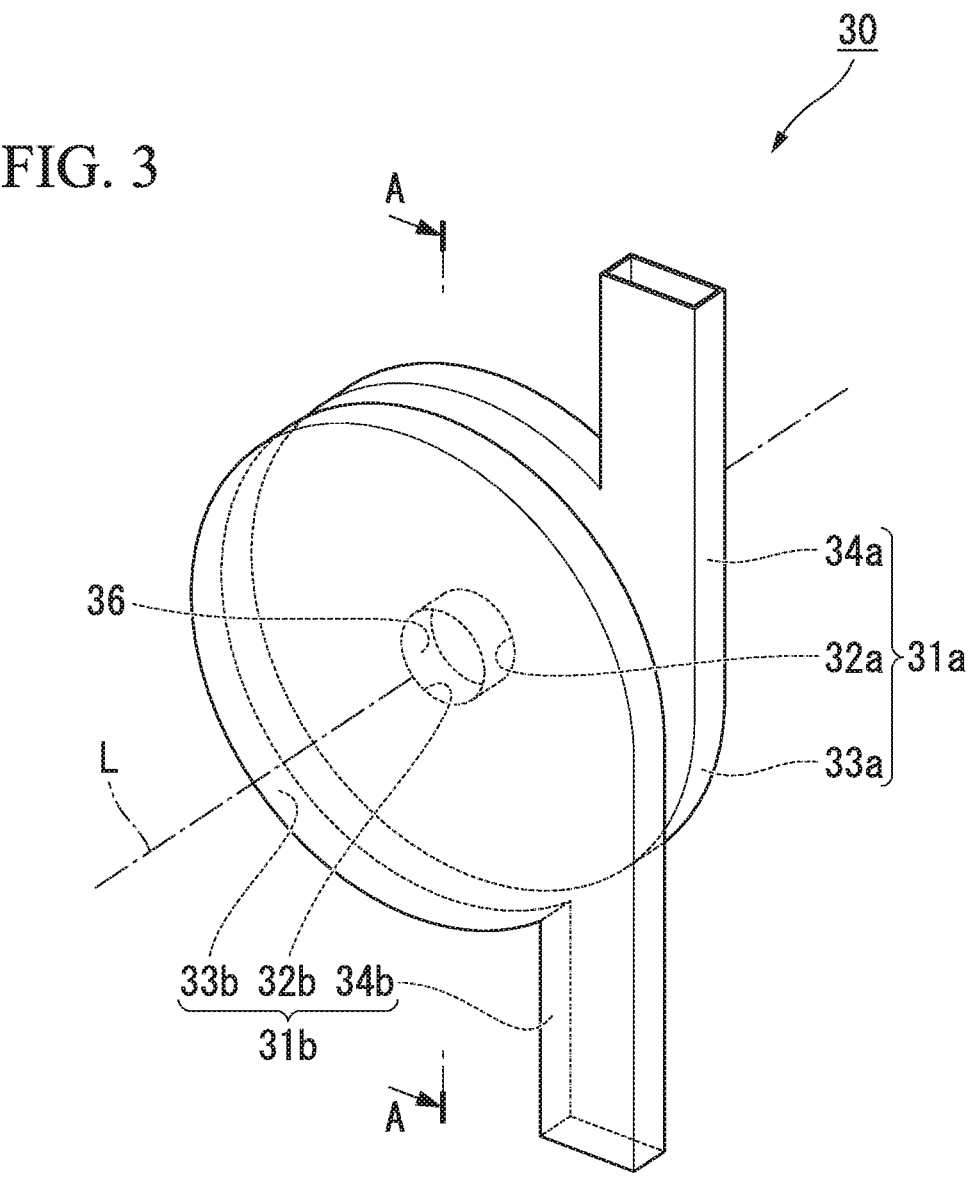
FIG. 3 is a schematic perspective view illustrating whirl chamber units disposed in the whirl chamber member illustrated in FIG. 2.
Figure 4:
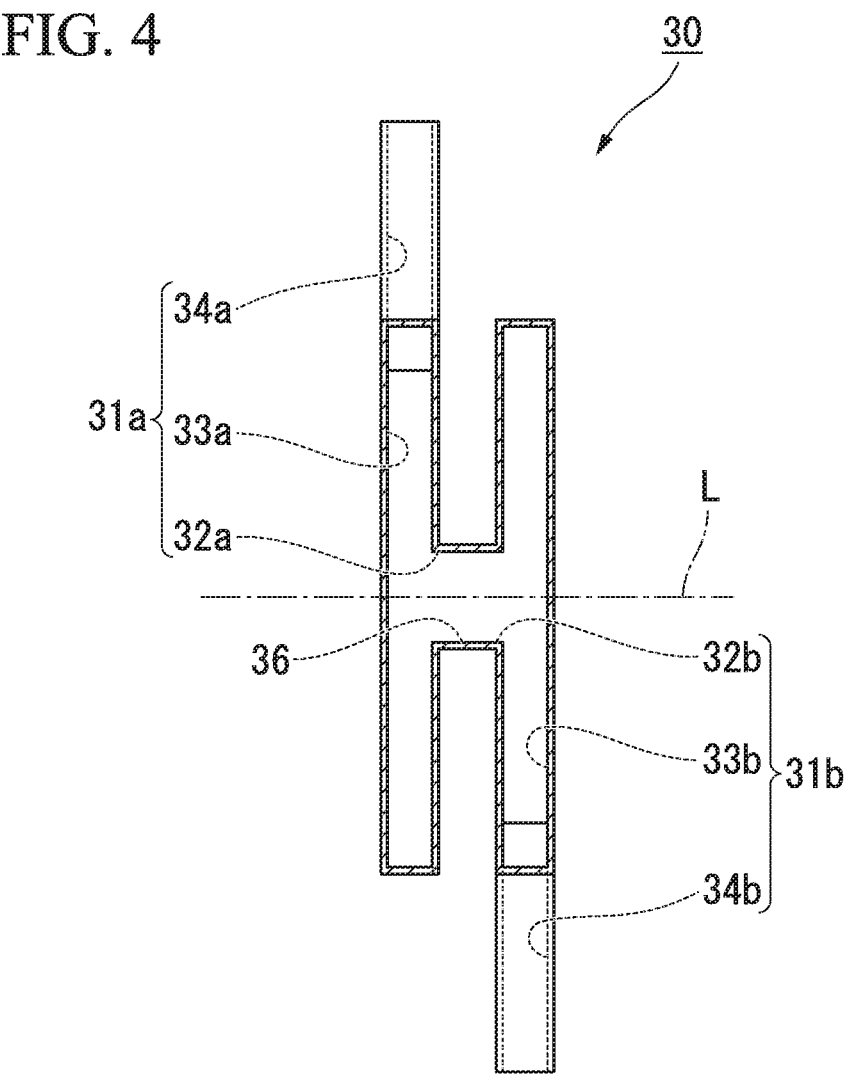
FIG. 4 is a cross-sectional view taken along a line A-A in FIG. 3.

The inner circumferential surface of the whirl chambers 33a and 33b has a circular shape. The rectification passages 34a and 34b cause one liquid chamber of the two liquid chambers 14 and 15 to communicate with the whirl chambers 33a and 33b. The rectification passages 34a and 34b are opened in the whirl chambers 33a and 33b in the circumferential direction of the whirl chambers 33a and 33b. The communication holes 32a and 32b cause the other liquid chamber of the two liquid chambers 14 and 15 to communicate with the whirl chambers 33a and 33b. As illustrated in FIGS. 3 and 4, the communication holes 32a and 32b are opened into the whirl chambers 33a and 33b from an end face (axial end face, bottom surface) among wall surfaces of the whirl chambers 33a and 33b in the direction of the axis L of the whirl chambers 33a and 33b. The communication holes 32a and 32b are arranged coaxial with the axis L of the whirl chambers 33a and 33b.

Figure 2:
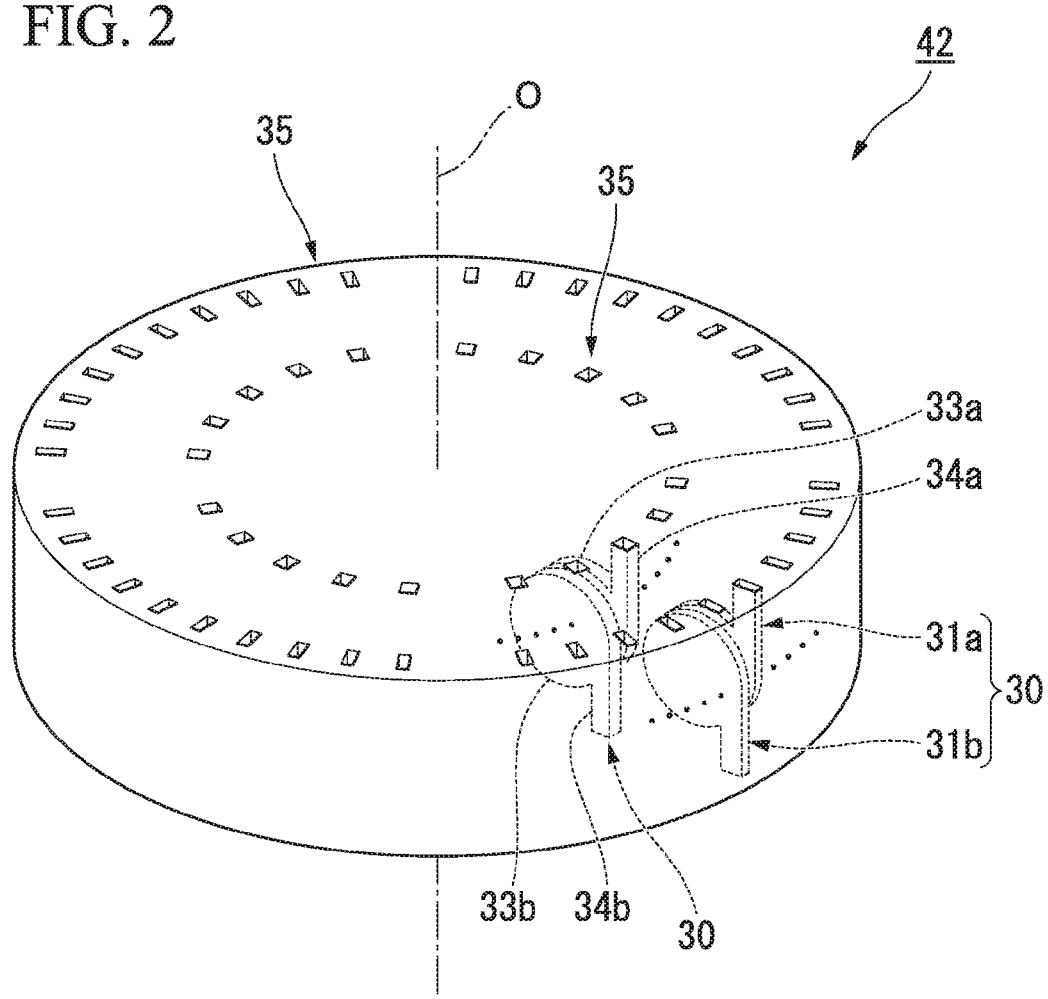
FIG. 2 is a perspective view illustrating a whirl chamber member disposed in a partition member of the vibration prevention device illustrated in FIG. 1.

As illustrated in FIG. 2, a plurality of whirl chamber units 31a and 31b are formed in the whirl chamber member 42. The axis L of each of the plurality of whirl chambers 33a and 33b of the whirl chamber member 42 extends along an intersection plane intersecting the axis O, extends along the circumferential direction in the illustrated example, and is located on a dividing plane 42b to be described below. Each of the plurality of rectification passages 34a and 34b of the whirl chamber member 42 extends linearly in the direction of the axis O and is opened on an end face facing the outside in the direction of the axis O in the whirl chamber member 42 of the partition member 16.

A plurality of whirl chamber units 31a and 31b are arranged in the circumferential direction and form unit lines 35 having an annular shape coaxial with the axis O. Two unit lines 35 are arranged with different diameters.

Here, the whirl chamber units 31a and 31b include a plurality of first whirl chamber units 31a and a plurality of second whirl chamber units 31b.

As illustrated in FIGS. 2 and 3, the plurality of first whirl chamber units 31a are formed to have the same shape and the same size. In each first whirl chamber unit 31a, a first whirl chamber 33a as the whirl chamber communicates with the primary liquid chamber 14 via a first rectification passage 34a as the rectification passage and communicates with the secondary liquid chamber 15 via a first communication hole 32a as the communication hole.

The plurality of second whirl chamber units 31b is formed to have the same shape and the same size. In each second whirl chamber unit 31b, a second whirl chamber 33b as the whirl chamber communicates with the secondary liquid chamber 15 via a second rectification passage 34b as the rectification passage and communicates with the primary liquid chamber 14 via a second communication hole 32b as the communication hole.

As illustrated in FIG. 2, the first whirl chamber units 31a and the second whirl chamber units 31b are provided in the same number and are alternately arranged in the circumferential direction. In the illustrated example, the number of first whirl chamber units 31a provided and the number of second whirl chamber units 31b provided are sixty, where twenty first whirl chamber units 31a and twenty second whirl chamber units 31b are arranged in the inner unit line 35 in the radial direction and forty first whirl chamber units 31a and forty second whirl chamber units 31b are arranged in the outer unit line 35 in the radial direction.

As illustrated in FIGS. 3 and 4, a set including the first whirl chamber unit 31a and an adjacent second whirl chamber unit 31b in the circumferential direction are connected via a communication passage 36 extending in the circumferential direction. The communication passage 36 is disposed between the first whirl chamber 33a and the second whirl chamber 33b and causes both whirl chambers 33a and 33b to communicate with each other.

The inner circumferential surface of the communication passage 36 has a circular shape. The communication passage 36 is opened in the whirl chambers 33a and 33b from the end faces of the first whirl chamber 33a and the second whirl chamber 33b. In the communication passage 36, the opening opened in the first whirl chamber 33a is the first communication hole 32a and the opening opened in the second whirl chamber 33b is the second communication hole 32b.

In a set of the first whirl chamber unit 31a and the second whirl chamber unit 31b, the first communication hole 32a of the first whirl chamber unit 31a communicates with the secondary liquid chamber 15 via the second whirl chamber unit 31b, and the second communication hole 32b of the second whirl chamber unit 31b communicates with the primary liquid chamber 14 via the first whirl chamber unit 31a. The first whirl chamber unit 31a and the second whirl chamber unit 31b constitute a connecting passage 30 causing the primary liquid chamber 14 and the secondary liquid chamber 15 to communicate with each other. A plurality of connecting passages 30 are formed in the partition member 16, but only one connecting passage 30 in each unit line 35 is indicated by a dotted line for the purpose of convenience of illustration in FIG. 2.

Figure 5:
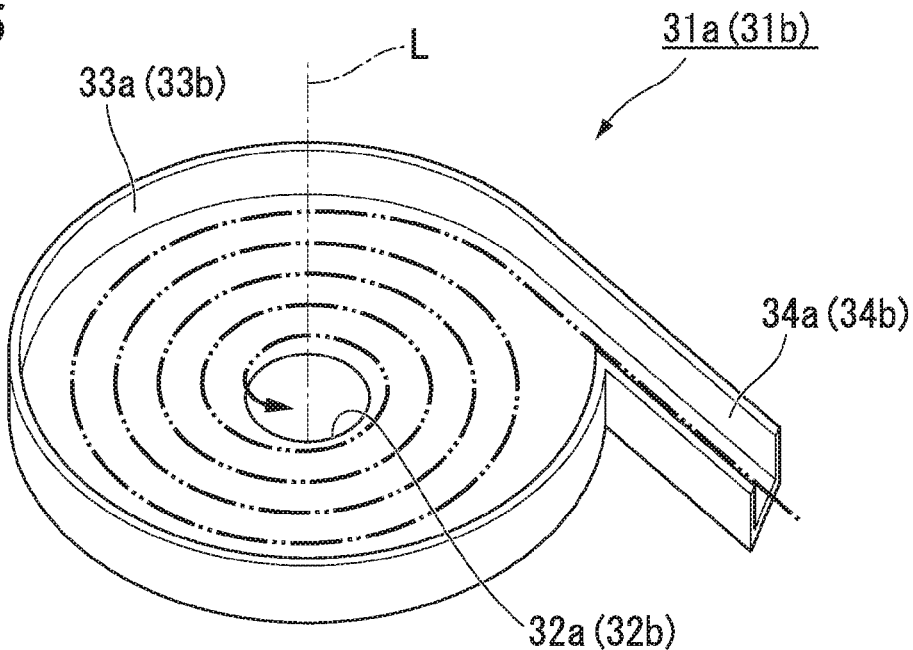
FIG. 5 is a schematic diagram of a whirl chamber unit disposed in the whirl chamber member illustrated in FIG. 2 and is a diagram illustrating a flow of a liquid when a flow rate of the liquid flowing from a rectification passage is high.
Figure 6:
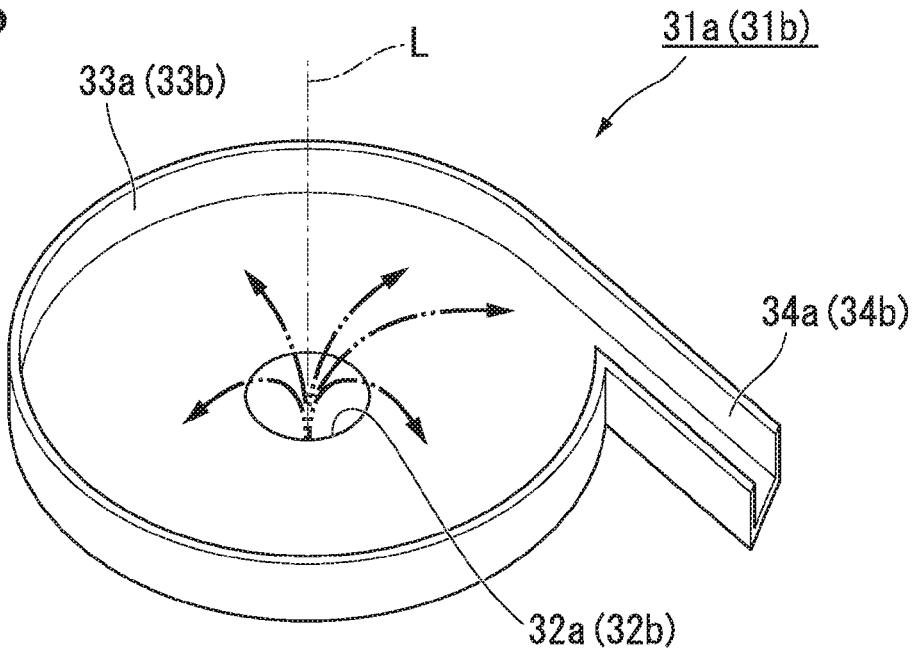
FIG. 6 is a schematic diagram of a whirl chamber unit disposed in the whirl chamber member illustrated in FIG. 2 and is a diagram illustrating a flow of a liquid flowing from a communication hole.
Figure 7:
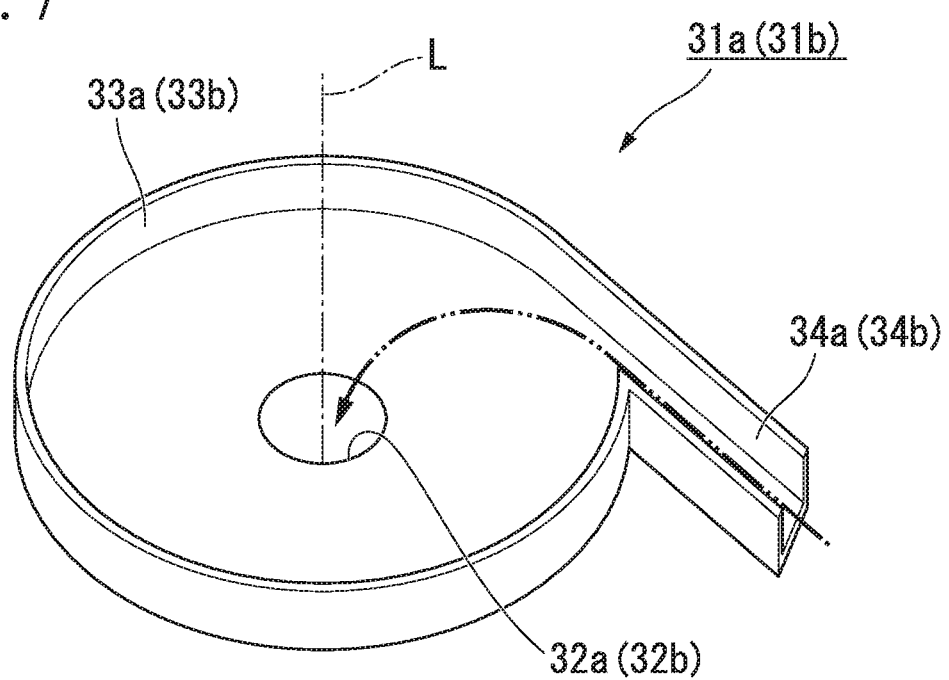
FIG. 7 is a schematic diagram of a whirl chamber unit disposed in the whirl chamber member illustrated in FIG. 2 and is a diagram illustrating a flow of a liquid when a flow rate of the liquid flowing from a rectification passage is low.

As illustrated in FIG. 5, the whirl chambers 33a and 33b whirl a liquid flowing therein. The whirl chambers 33a and 33b form a whirl flow of the liquid depending on the flow rate of the liquid flowing from the rectification passages 34 and 34b, and cause the liquid to flow from the communication holes 32a and 32b. The rectification passages 34a and 34b extend from the inner circumferential surfaces of the whirl chambers 33a and 33b along the tangential directions of the inner circumferential surfaces, and the liquid flowing into the whirl chambers 33a and 33b from the rectification passages 34a and 34b is whirled by flowing along the inner circumferential surfaces of the whirl chambers 33a and 33b. As illustrated in FIG. 6, when a liquid flows into the whirl chambers 33a and 33b from the communication holes 32a and 32b, the liquid is not whirled in the whirl chambers 33a and 33b and merely passes therethrough.

As illustrated in FIG. 1, the limiting passage 44 is disposed independent of the connecting passage 30 and is disposed on the outer circumferential surface of the attachment member 41 in the illustrated example. The resonance frequency of the limiting passage 44 is set to be equal to a shake vibration (first vibration) (for example, the frequency is equal to or less than 14 Hz and the amplitude is greater than ±0.5 mm) frequency so as to generate resonance (liquid-column resonance) with respect to the input of shake vibration.

The resonance frequency of the limiting passage 44 is set to be lower than the resonance frequency of the rectification passages 34a and 34b. The resonance frequency of the rectification passages 34a and 34b is set to be equal to an idle vibration (second vibration) (for example, the frequency ranges from 15 Hz to 40 Hz and the amplitude is equal to or less than ±0.5 mm) frequency. The rectification passages 34a and 34b serve as orifices for generating resonance (liquid-column resonance) with respect to the input of idle vibration.

The whirl chamber member 42 is divided into two divided bodies 42a in the direction of the axis O. The whirl chamber member 42 is divided by a dividing plane 42b extending to intersect the axis O. The dividing plane 42b is perpendicular to the axis O. The dividing plane 42b divides the whirl chambers 33a and 33b and the communication holes 32a and 32b of all the whirl chamber units 31a and 31b in the direction of the axis O. The outer circumferential edge of the dividing plane 42b reaches the outer circumferential surface of the whirl chamber member 42, but the dividing plane 42b is not illustrated for the purpose of convenient illustration in FIG. 2.

Operations of the vibration prevention device 10 will be described below.

In the vibration prevention device 10, the whirl chamber units 31a and 31b are designed such that shake vibration is absorbed and damped by the plurality of first whirl chamber units 31a and the plurality of second whirl chamber units 31b when the shake vibration is input.

That is, when the shake vibration in the direction of the axis O is input to the vibration prevention device 10, both attachment members 11 and 12 are relatively displaced while elastically deforming the elastic body 13 and the liquid pressure of the primary liquid chamber 14 varies. Then, the liquid in the primary liquid chamber 14 flows into the first whirl chambers 33a via the first rectification passages 34a by a large amount per unit time depending on the amplitude of the shake vibration. That is, as indicated by a two-dot chained line in FIG. 5, when the shake vibration is input, a liquid having a higher flow rate flows into the first whirl chambers 33a. Accordingly, for example, a flow is formed to whirl in the first whirl chamber 33a, by an inertial force of the liquid flowing therein and this flow is developed into a whirl. At this time, the liquid in the secondary liquid chamber 15 flows into the second whirl chambers 33b via the second rectification passages 34b by a larger amount per unit time depending on the amplitude of the shake vibration, a flow is formed to whirl in the second whirl chamber 33b by the inertial force of the liquid flowing therein, and this flow is developed into a whirl.

In this way, since flow resistance between the primary liquid chamber 14 and the secondary liquid chamber 15 via each connecting passage 30 increases, the liquid preferentially flows between the primary liquid chamber 14 and the secondary liquid chamber 15 via the limiting passage 44, and liquid-column resonance is generated in the limiting passage 44 to absorb and damp the shake vibration.

On the other hand, when the idle vibration is input in the direction of the axis O to the vibration prevention device 10 and the liquid pressure in the primary liquid chamber 14 varies as described above, a small amount of liquid based on the amplitude of the idle vibration flows in the whirl chambers 33a and 33b. As a result, a whirl flow in the whirl chambers 33a and 33b is not sufficiently developed by the liquid flowing into the whirl chambers 33a and 33b, and the liquid flowing in the whirl chambers 33a and 33b passes therethrough without being swirled or with a small degree of swirling as indicated by a two-dot chained line in FIG. 7. Accordingly, the flow resistance between the primary liquid chamber 14 and the secondary liquid chamber 15 via each connecting passage 30 is suppressed to be low. As a result, it is possible to cause the liquid to actively flow through the connecting passage 30 and to generate resonance in the rectification passages 34a and 34b to absorb and damp the idle vibration.

As described above, in the vibration prevention device 10 according to this embodiment, by disposing the whirl chamber units 31a and 31b instead of the plunger member as in the related art, it is possible to absorb and damp both the shake vibration and the idle vibration and thus to achieve simplification in the structure of the vibration prevention device 10 and facilitation of manufacturing.

Since the whirl chamber units 31a and 31b include a plurality of first whirl chamber units 31a, as illustrated in FIG. 2, it is possible to suppress the size of the opening opened in the primary liquid chamber 14 in each rectification passage 34a of the plurality of first whirl chamber units 31a so as to be small and to secure the total opening area of the openings to be equivalent to the opening area of the opening of the rectification passage 34a when only a single first whirl chamber unit 31a is disposed.

As described above, since the size of the opening of each rectification passage 34a of the plurality of first whirl chamber units 31a can be suppressed to be small, it is possible to suppress the volume of each whirl chamber 33a of the plurality of first whirl chamber units 31a to be small. Accordingly, the total volume of the whirl chambers 33a can be set to be smaller than the volume of the whirl chamber 33a when only a single first whirl chamber unit 31a is provided as the whirl chamber unit.

As a result, in the vibration prevention device 10, in comparison with the case in which only a single first whirl chamber unit 31a is provided, it is possible to secure the opening area of the openings of the rectification passages 34a to be equivalent and to reduce the volume of the whirl chambers 33a, as a whole of the plurality of first whirl chamber units 31a.

In this way, the opening area of the openings of the rectification passages 34a can be secured to be equivalent as a whole of the plurality of first whirl chamber units 31a. Even when the volume of the whirl chamber 33a is small, it is possible to damp and absorb vibration to the same extent as in the case in which only a single first whirl chamber unit 31a is provided.

As described above, the volume of the whirl chambers 33a can be reduced as a whole of the plurality of first whirl chamber units 31a. Accordingly, when desired vibration having a small amplitude is input, a liquid can be whirled in the whirl chamber 33a of each first whirl chamber unit 31a more sensitively in comparison with the case in which only a signal first whirl chamber unit 31 is provided. As a result, it is possible to easily absorb and damp vibration and to exhibit damping characteristics of the vibration prevention device 10 with high accuracy.

The whirl chamber units 31a and 31b include the first whirl chamber units 31a and the second whirl chamber units 31b. Accordingly, it is possible to absorb and damp vibration by causing a liquid flowing from the primary liquid chamber 14 to the secondary liquid chamber 15 to flow via the first whirl chamber unit 31a, and it is possible to absorb and damp vibration by causing a liquid flowing from the secondary liquid chamber 15 to the primary liquid chamber 14 to flow via the second whirl chamber unit 31b, thereby effectively absorbing and damping the vibration.

Since the communication holes 32a and 32b are opened into the whirl chambers 33a and 33b from the end faces of the whirl chambers 33a and 33b, it is possible to stably generate a whirl flow of a liquid and thus to effectively damp and absorb vibration. Since the communication holes 32a and 32b are arranged coaxial with the axis L of the whirl chambers 33a and 33b, it is possible to secure the length in the whirl direction of the whirl flow of a liquid formed in the whirl chambers 33a and 33b to be great and to cause the liquid to easily stay in the whirl chambers 33a and 33b, thereby more effectively damping and absorbing vibration.

Since the axis L of the whirl chambers 33a and 33b extends along the intersection plane, a large number of whirl chamber units 31a and 31b can be easily formed in the partition member 16 and it is thus possible to enhance space efficiency of the vibration prevention device 10.

Since a plurality of whirl chamber units 31a and 31b are arranged in the circumferential direction, a larger number of whirl chamber units 31a and 31b can be easily formed in the partition member 16 and it is thus possible to further enhance space efficiency of the vibration prevention device 10.

The dividing plane 42b divides the whirl chambers 33a and 33b of all the whirl chamber units 31a and 31b in the direction of the axis O, and the rectification passages 34a and 34b extend in the direction of the axis O and are opened on the end face of the partition member 16. Accordingly, when the divided bodies 42a are formed using a mold, the mold can be easily released in the direction of the axis O from the divided bodies 42a and it is thus possible to simply form the vibration prevention device 10.

Second Embodiment

A vibration prevention device according to a second embodiment of the present invention will be described below with reference to FIG. 8.

In the second embodiment, the same elements as in the first embodiment will be referenced by the same reference numerals or signs, description thereof will not be repeated, and only differences will be described below.

Figure 8:
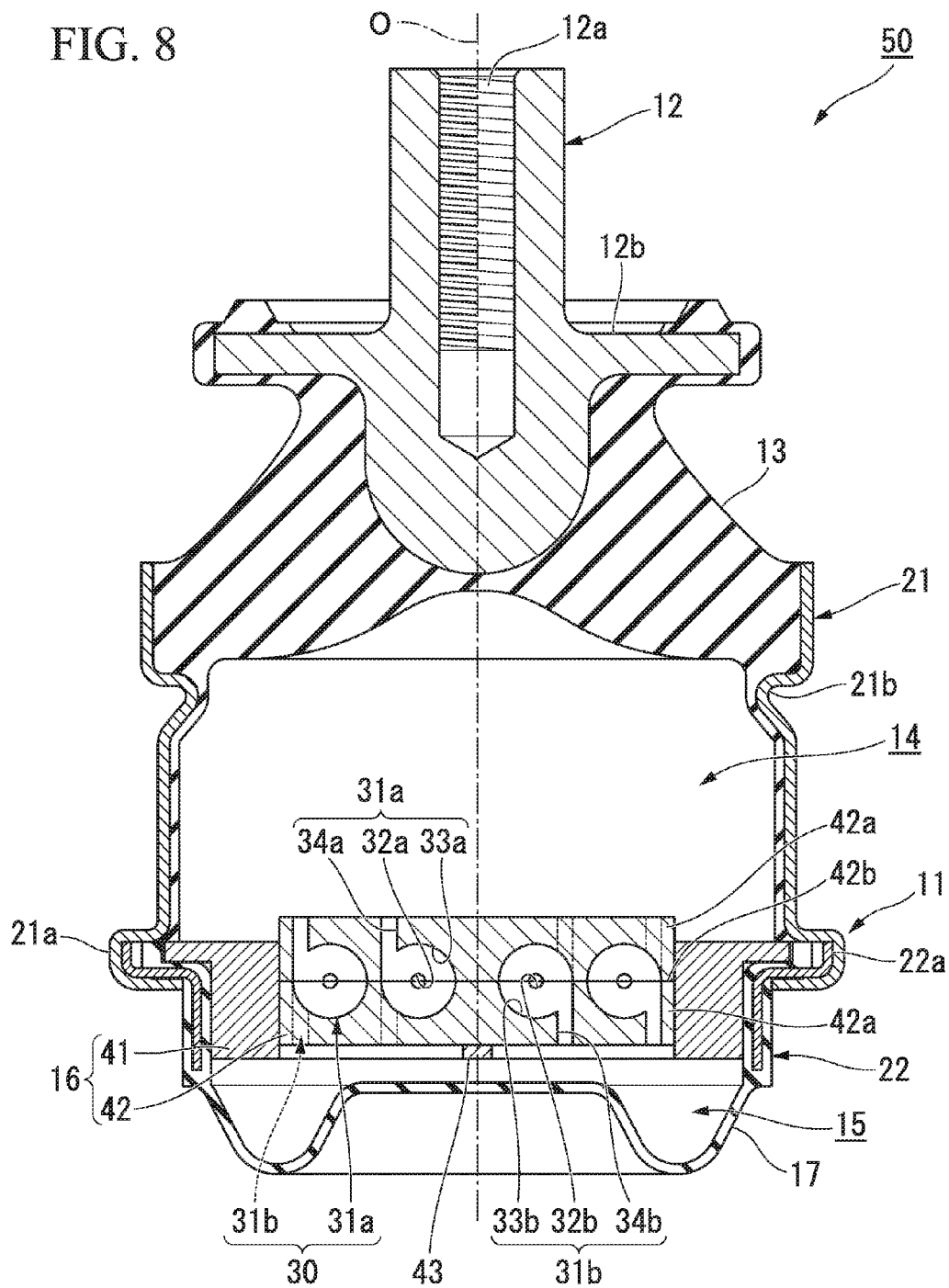
FIG. 8 is a longitudinal-sectional view of a vibration prevention device according to a second embodiment of the present invention.
Figure 9:
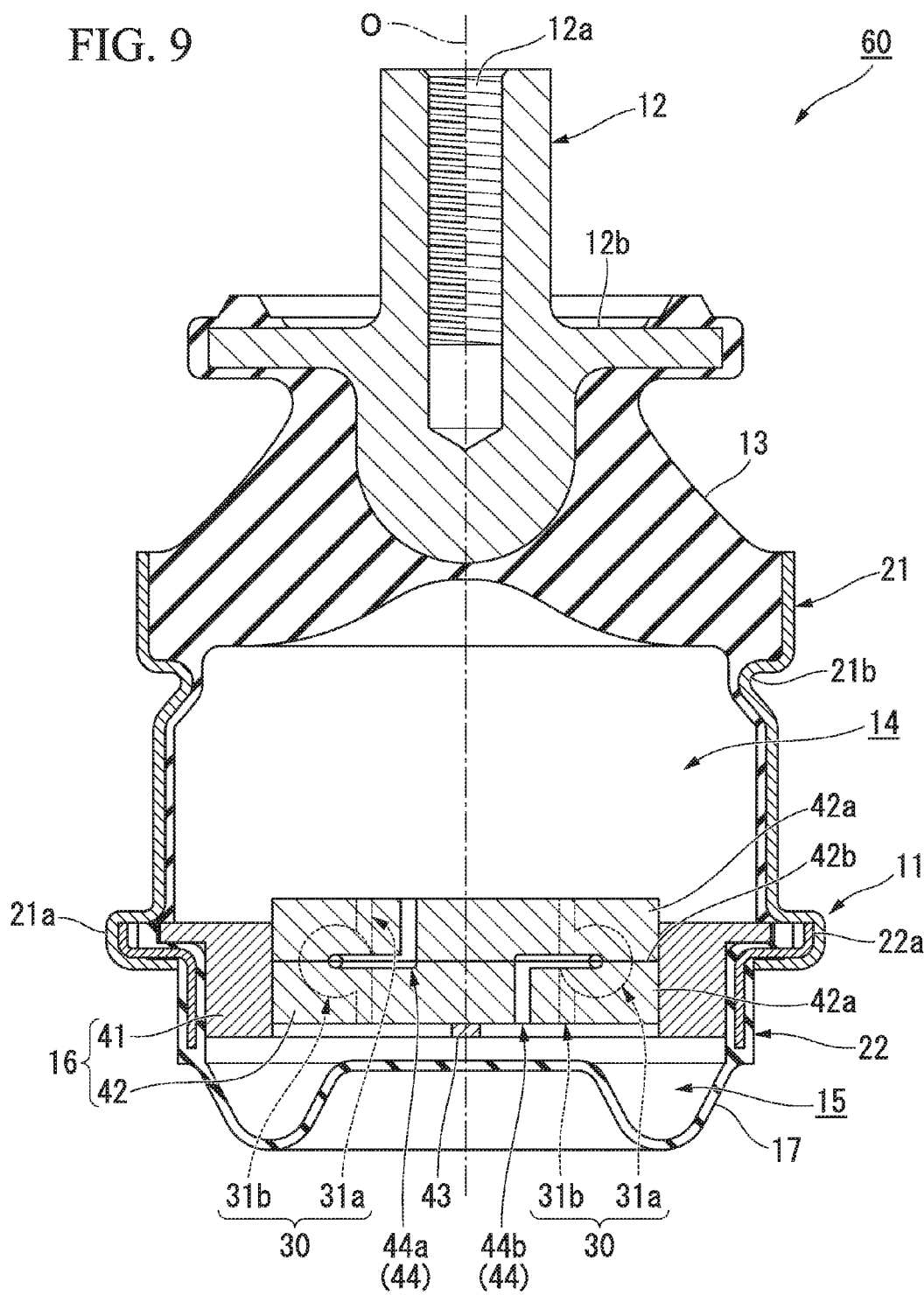
FIG. 9 is a longitudinal-sectional view of a vibration prevention device according to a third embodiment of the present invention.
Figure 10:
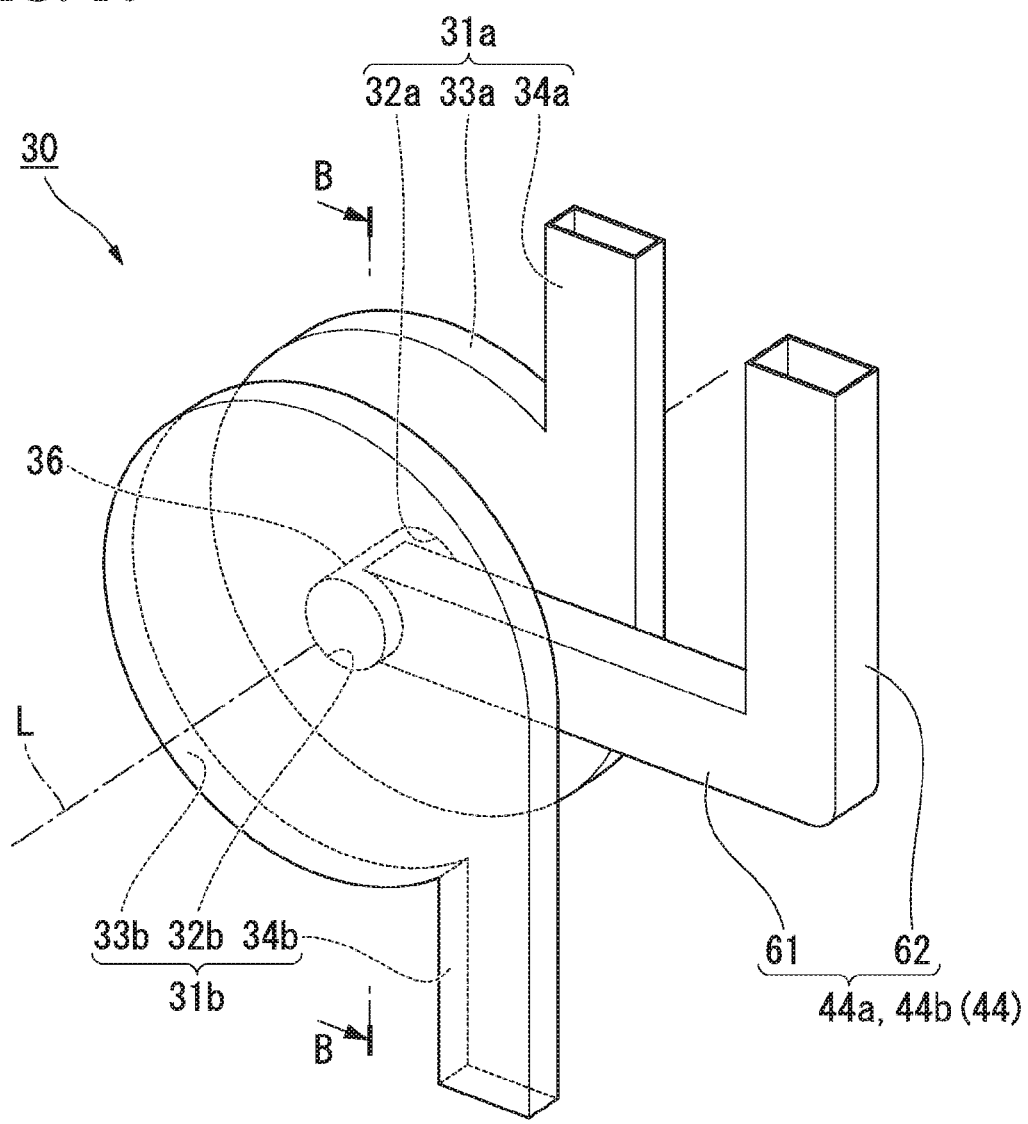
FIG. 10 is a schematic perspective view illustrating whirl chamber units disposed in a whirl chamber member illustrated in FIG. 9.
Figure 11:
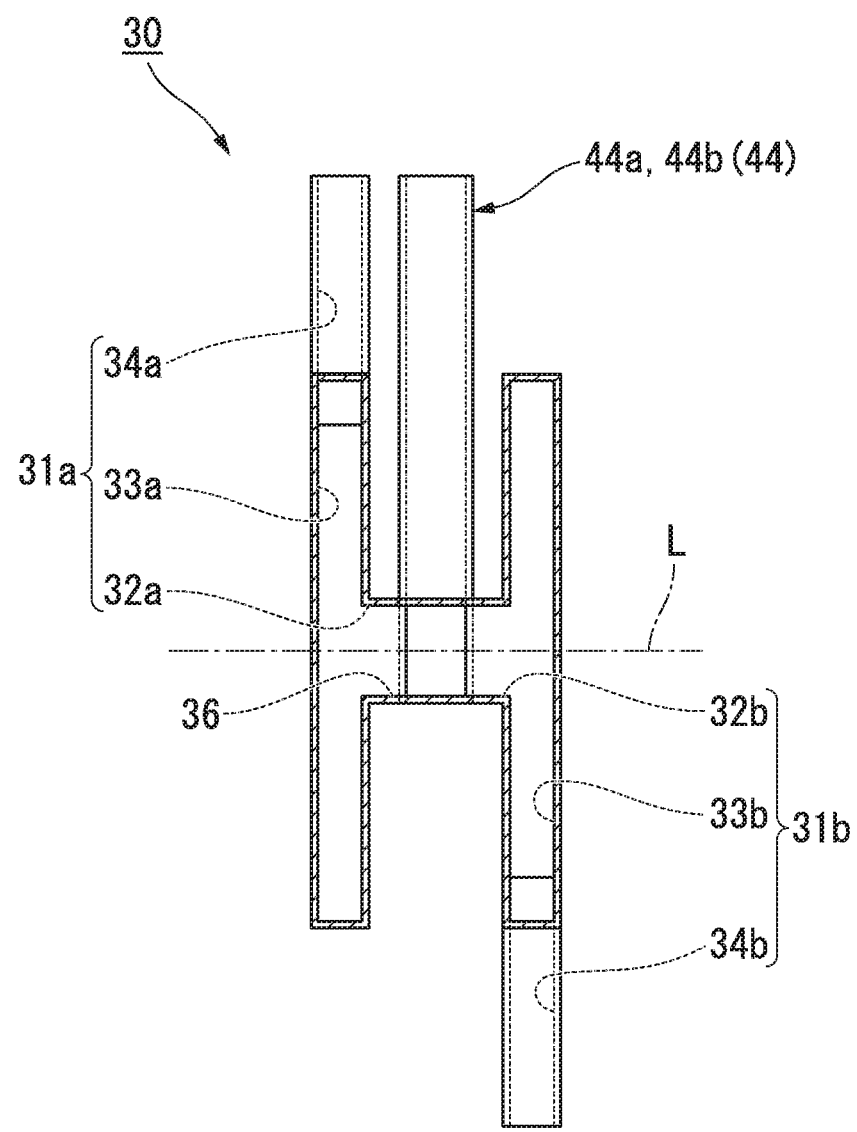
FIG. 11 is a cross-sectional view taken along a line B-B in FIG. 10.
Figure 12:
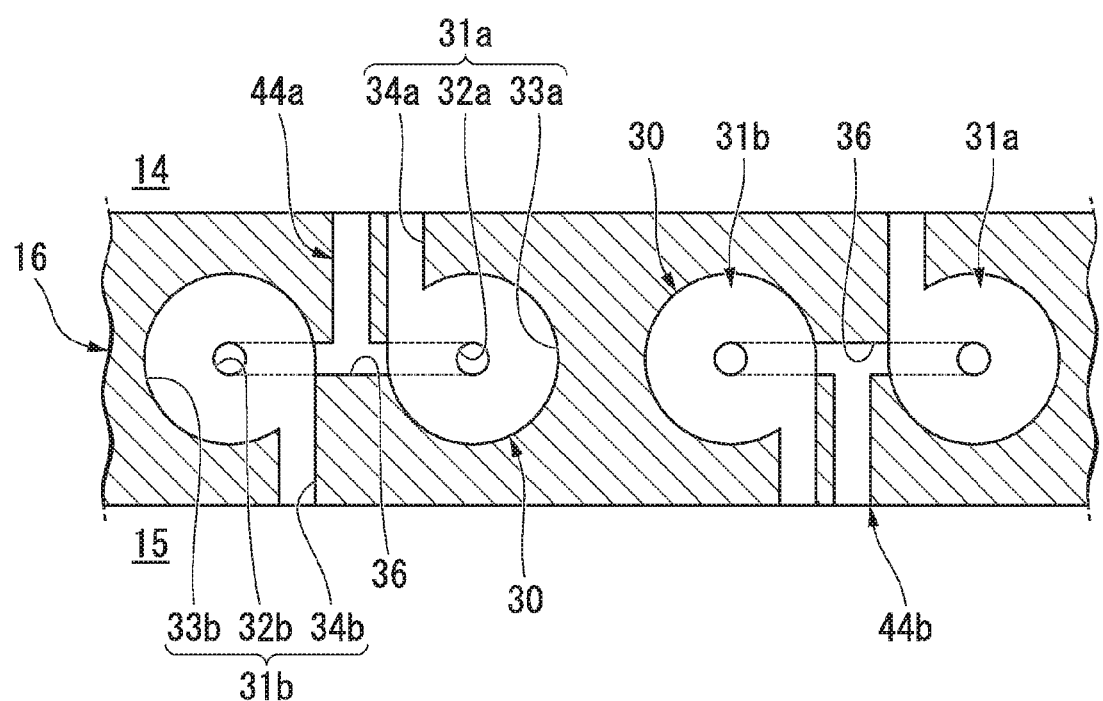
FIG. 12 is a schematic diagram illustrating a limiting passage of the vibration prevention device illustrated in FIG. 9.

As illustrated in FIG. 8, in a vibration prevention device 50, the primary liquid chamber 14 and the secondary liquid chamber 15 communicate with each other via only the connecting passage 30 and the limiting passage 44 is not provided. When normal vibration such as shake vibration and idle vibration is input, the whirl chamber units 31a and 31b are designed such that the vibration is absorbed and damped by a plurality of first whirl chamber units 31a and a plurality of second whirl chamber units 31b.

That is, idle vibration has a relatively small amplitude and relatively high frequency and shake vibration has a low frequency and a larger amplitude. Accordingly, when such normal vibration is input, the flow rate of a liquid flowing into the first whirl chamber 33a via the first rectification passage 34a from the primary liquid chamber 14 can be increased by a predetermined value or more. Accordingly, by setting the shape of the whirl chamber units 31a and 31b according to this embodiment to be different from that of the whirl chamber units 31a and 31b of the vibration prevention device 10 according to the above-mentioned embodiment, a whirl flow of a liquid can be formed in the first whirl chamber 33a as indicated by a two-dot chained line in FIG. 5 even when one of the shake vibration and idle vibration is input.

As a result, it is possible to enhance pressure loss of a liquid, for example, based on viscous resistance of a liquid, energy loss due to formation of a whirl flow, energy loss due to friction between the liquid and the wall surface of the first whirl chamber 33a, and the like, thereby absorbing and damping vibration. At this time, when a liquid flows into the first whirl chamber 33a in a state in which the amount of liquid flowing into the first whirl chamber 33a is markedly increased with an increase in the flow rate of the liquid and the first whirl chamber 33a is filled with the whirl flow formed by the liquid flowing into the first whirl chamber 33a, it is possible to secure the pressure loss of the liquid to be great.

The liquid whirling in the first whirl chamber 33a flows out from the first communication hole 32a and flows into the secondary liquid chamber 15 via the communication passage 36 and the second whirl chamber unit 31b. At this time, as indicated by a two-dot chained line in FIG. 6, the liquid flowing from the second communication hole 32b into the second whirl chamber 33b merely passes through the second whirl chamber 33b without being whirled and flows into the secondary liquid chamber 15.

When a liquid in the secondary liquid chamber 15 flows to the primary liquid chamber 14 via the connecting passage 30, the liquid first flows into the second whirl chamber 33b via the second rectification passage 34b. At this time, when the flow rate of the liquid is a predetermined value or higher, as indicated by a two-dot chained line in FIG. 5, it is possible to form a whirl flow of the liquid in the second whirl chamber 33b and to enhance the pressure loss of the liquid, thereby absorbing and damping vibration. In the illustrated example, the whirl flow in the second whirl chamber 33b is whirled in the same direction along the circumferential direction as the whirl flow in the first whirl chamber 33a.

The liquid whirled in the second whirl chamber 33b flows out from the second communication hole 32b and flows into the primary liquid chamber 14 via the communication passage 36 and the first whirl chamber unit 31a. At this time, as indicated by a two-dot chained line in FIG. 6, the liquid flowing into the first whirl chamber 33a from the first communication hole 32a merely passes through the first whirl chamber 33a without being whirled and flows into the primary liquid chamber 14.

For example, micro vibration having a frequency higher than assumed and having a very small amplitude may be unintentionally input to the vibration prevention device 50. When micro vibration is input, the flow rate of a liquid flowing into the whirl chambers 33a and 33b via the rectification passages 34a and 34b is low and thus the whirling of the liquid in the whirl chambers 33a and 33b is suppressed as indicated by a two-dot chained line in FIG. 7. When a whirl flow of the liquid is not generated in the whirl chambers 33a and 33b, the liquid merely passes through the whirl chambers 33a and 33b and smoothly flows, and thus an increase in the dynamic spring constant is suppressed.

As described above, in the vibration prevention device 50 according to this embodiment, it is possible to enhance pressure loss of a liquid to absorb and damp vibration by forming a whirl flow of a liquid in the whirl chambers 33a and 33b. As a result, for example, when normal vibration such as idle vibration or a shake vibration is input, it is possible to absorb and damp vibration depending on a flow rate of a liquid regardless of the vibration frequency. Accordingly, it is possible to absorb and damp a plurality of types of vibration having different frequencies and to achieve simplification in the structure and facilitation of manufacturing.

In a state in which a flow rate is low and a whirl flow of a liquid in the whirl chambers 33a and 33b is suppressed, an increase in the dynamic spring constant is suppressed. Accordingly, when the flow rate of the liquid is lower than that when normal vibration is input, for example, when unintentional vibration such as micro vibration having a frequency higher than that of the normal vibration and having a very smaller amplitude than that of the normal vibration is input, it is possible to suppress an increase in the dynamic spring constant and thus to easily secure product characteristics of the vibration prevention device 50.

Third Embodiment

A vibration prevention device according to a third embodiment of the present invention will be described below with reference to FIGS. 9 to 12.

In the third embodiment, the same elements as in the first embodiment will be referenced by the same reference numerals or signs, description thereof will not be repeated, and only differences will be described below.

As illustrated in FIGS. 9 to 12, in a vibration prevention device 60, the limiting passage 44 is connected to the connecting passage 30 without being disposed independent of the connecting passage 30. The limiting passage 44 is disposed for each of a plurality of connecting passages 30. The limiting passages 44 are connected to the communication passages 36 of the connecting passages 30.

The limiting passage 44 includes a first limiting passage 44a and a second limiting passage 44b. The first limiting passage 44a causes the communication passage 36 and the primary liquid chamber 14 to communicate with each other. The second limiting passage 44b causes the communication passage 36 and the secondary liquid chamber 15 to communicate with each other. The first limiting passage 44a and the second limiting passage 44b are alternately arranged in the circumferential direction for a plurality of connecting passages 30, and the different types of limiting passages 44 are disposed in the connecting passages 30 adjacent to each other in the circumferential direction.

Each of the limiting passages 44a and 44b includes a horizontal passage 61 and a vertical passage 62. The horizontal passage 61 extends in the radial direction from the communication passage 36. The axis of the horizontal passage 61 is located on the dividing plane 42b. The vertical passage 62 extends to the outside in the direction of the axis O from the horizontal passage 61 and is opened in the primary liquid chamber 14 or the secondary liquid chamber 15.

When shake vibration is input to the vibration prevention device 60 and a liquid is about to flow into the connecting passage 30 from the primary liquid chamber 14, a whirl flow is generated in the first whirl chamber 33a as described above. As a result, the liquid in the primary liquid chamber 14 flows into the secondary liquid chamber 15 via the first limiting passage 44a, the communication passage 36, and the second whirl chamber unit 31b. At this time, when a liquid flows into the connecting passage 30 from the secondary liquid chamber 15, a whirl flow is generated in the second whirl chamber 33b as described above. As a result, the liquid in the secondary liquid chamber 15 flows into the primary liquid chamber 14 via the second limiting passage 44b, the communication passage 36, and the first whirl chamber unit 31a.

As described above, when the shake vibration is input, it is possible to absorb and damp the vibration by causing the liquid to flow through the first limiting passage 44a or the second limiting passage 44b.

The technical scope of the present invention is not limited to the above-mentioned embodiments, but various modifications can be added without departing from the gist of the present invention.

In the above-mentioned embodiments, the vibration prevention devices 10 and 50 absorb and damp both idle vibration and shake vibration, but the present invention is not limited to this configuration. The present invention can be appropriately modified into another configuration in which both of the first vibration and the second vibration having a frequency higher than that of the first vibration can be absorbed and damped.

In the above-mentioned embodiments, the rectification passages 34a and 34b are disposed in the whirl chamber units 31a and 31b one to one, but the present invention is not limited to this configuration. For example, a plurality of rectification passages may be disposed in each whirl chamber unit.

In the above-mentioned embodiments, the first whirl chamber 33a and the second whirl chamber 33b communicate with each other via the communication passage 36, but the present invention is not limited to this configuration. For example, the first whirl chamber and the second whirl chamber may be adjacent to each other in the circumferential direction with a thin plate-like wall portion interposed therebetween and may communicate with each other via a hole through the wall portion in the circumferential direction. In this case, the first communication hole and the second communication hole can be constituted by the common hole portion.

In the above-mentioned embodiments, the axis L of the whirl chambers 33a and 33b extends along the circumferential direction and extends along the intersection plane, but the present invention is not limited to this configuration. For example, the axis of the whirl chamber may extend in the axial direction of the first attachment member.

In the above-mentioned embodiments, the rectification passages 34a and 34b extend in the direction of the axis O, but the present invention is not limited to this configuration. For example, the rectification passages may extend in the radial direction of the first attachment member.

In a modified example of the present invention, the dividing plane may not divide the whirl chambers of all the whirl chamber units in the axial direction of the first attachment member.

In the above-mentioned embodiment, the first communication hole 32a communicates with the secondary liquid chamber 15 via the second whirl chamber unit 31b, but the present invention is not limited to this configuration. For example, the first communication hole may be opened directly into the secondary liquid chamber. In this case, for example, the first rectification passage rather than the first communication hole may communicate with the primary liquid chamber via the second whirl chamber unit.

In the above-mentioned embodiments, the second communication hole 32b communicates with the primary liquid chamber 14 via the first whirl chamber unit 31a, but the present invention is not limited to this configuration. For example, the second communication hole may be opened directly into the primary liquid chamber. In this case, for example, the second rectification passage rather than the second communication hole may communicate with the secondary liquid chamber via the first whirl chamber unit.

In the above-mentioned embodiments, the whirl chamber units 31a and 31b include the first whirl chamber unit 31a and the second whirl chamber unit 31b, but the present invention is not limited to this configuration. For example, only a plurality of first whirl chamber units may be disposed as the whirl chamber units. That is, in a modified example of the present invention, the present invention can be appropriately modified into another configuration in which each whirl chamber unit includes a plurality of first whirl chamber units in which a first whirl chamber as the whirl chamber communicates with the first liquid chamber via a first rectification passage as the rectification passage and communicates with the second liquid chamber via a first communication hole as the communication hole.

In the above-mentioned embodiments, the vibration prevention devices 10 and 50 include the primary liquid chamber 14 as the first liquid chamber and the secondary liquid chamber 15 as the second liquid chamber, but the present invention is not limited to this configuration. For example, the present invention may be appropriately modified into another configuration in which the vibration prevention device includes the secondary liquid chamber as the first liquid chamber and the primary liquid chamber as the second liquid chamber.

In the above-mentioned embodiments, the partition member 16 partitions the liquid chamber in the first attachment member 11 into the primary liquid chamber 14 having the elastic body 13 as a part of the wall surface and the secondary liquid chamber 15, but the present invention is not limited to this configuration. For example, a pair of elastic bodies may be provided in the axial direction instead of providing the diaphragm and a pressure-receiving liquid chamber having the elastic body as a part of a wall surface may be provided instead of providing the secondary liquid chamber. That is, the present invention may be appropriately modified into another configuration in which the partition member partitions the liquid chamber in the first attachment member having a liquid enclosed therein into a first liquid chamber and a second liquid chamber and at least one of both the first liquid chamber and the second liquid chamber has an elastic body as a part of the wall surface thereof.

The whirl chamber units 31a and 31b are not limited to the above-mentioned embodiments, but may be appropriately modified into another configuration having a whirl chamber that forms a whirl flow of a liquid depending on a flow rate of the liquid flowing from the rectification passage and causes the liquid to flow out from the communication hole.

In the above-mentioned embodiments, an engine is connected to the second attachment member 12 and the first attachment member 11 is connected to a vehicle body, but the first attachment member and the second attachment member may be connected in the reverse order.

The vibration prevention devices 10 and 50 according to the present inventions are not limited to a vehicle engine mount type, but types other than the engine mount type. For example, the vibration prevention device according to the present invention may be mounted in a power generator mounted in a construction machine or may be mounted in a machine installed in a plant or the like.

Without departing from the gist of the present invention, the elements of the above-mentioned embodiments may be appropriately substituted with known elements and the above-mentioned modified examples may be appropriately combined.

INDUSTRIAL APPLICABILITY

According to the vibration prevention device, it is possible to exhibit damping characteristics with high accuracy.

REFERENCE SIGNS LIST 10, 50 vibration prevention device
11 first attachment member
12 second attachment member
13 elastic body
14 primary liquid chamber
15 secondary liquid chamber
16 partition member
31a first whirl chamber unit
31b second whirl chamber unit
32a first communication hole
32b second communication hole
33a first whirl chamber
33b second whirl chamber
34a first rectification passage
34b second rectification passage
42 whirl chamber member
42b dividing plane
44 limiting passage
L axis of whirl chamber
O axis of first attachment member

The invention claimed is:

1. A vibration prevention device comprising:
a first attachment member having a tubular shape that is connected to one of a vibration source and a vibration receiver and a second attachment member that is connected to the other thereof;
an elastic body that connects two attachment members; and
a partition member that partitions a liquid chamber in the first attachment member having a liquid enclosed therein into a first liquid chamber and a second liquid chamber,
at least one of the first liquid chamber and the second liquid chamber having the elastic body as a part of a wall surface thereof,
wherein the partition member is provided with a whirl chamber unit that causes the two liquid chambers to communicate with each other,
the whirl chamber unit includes
a whirl chamber that whirls a liquid flowing therein,
a rectification passage that causes one liquid chamber of the two liquid chambers to communicate with the whirl chamber and that is opened in the whirl chamber in a circumferential direction of the whirl chamber, and
a communication hole that causes the other liquid chamber of the two liquid chambers to communicate with the whirl chamber,
the whirl chamber forms a whirl flow of the liquid depending on a flow rate of the liquid flowing from the rectification passage and causes the liquid to flow from the communication hole,
the whirl chamber unit includes a plurality of first whirl chamber units in which a first whirl chamber as the whirl chamber communicates with the first liquid chamber via a first rectification passage as the rectification passage and communicates with the second liquid chamber via a first communication hole as the communication hole,
the partition member partitions the liquid chamber in an axial direction of the first attachment member, and
an axis of the whirl chamber extends along an intersection plane intersecting the axis of the first attachment member.

2. The vibration prevention device according to claim 1, wherein the partition member is provided with a limiting passage that causes the two liquid chambers to communicate with each other and of which a resonance frequency is set to be equal to a first vibration frequency, and
a resonance frequency of the rectification passage is set to be equal to a second vibration frequency higher than the first vibration frequency.

3. The vibration prevention device according to claim 1, wherein the axis of the whirl chamber extends in a circumferential direction of the first attachment member, and
a plurality of the whirl chamber units are arranged in the circumferential direction of the first attachment member.

4. The vibration prevention device according to claim 1, wherein the partition member is provided with a whirl chamber member having the whirl chamber unit formed therein,
the whirl chamber member is divided in the axial direction of the first attachment member by a dividing plane extending to intersect the axis of the first attachment member,
the dividing plane divides the whirl chambers of all the whirl chamber units in the axial direction of the first attachment member, and
the rectification passage extends in the axial direction of the first attachment member and is opened on an end face of the partition member facing the outside in the axial direction of the first attachment member.

5. The vibration prevention device according to claim 1, wherein the communication hole is opened into the whirl chamber from an end face of a wall surface of the whirl chamber facing an axial direction of the whirl chamber.

6. The vibration prevention device according to claim 5, wherein the communication hole is disposed coaxial with the axis of the whirl chamber.

7. The vibration prevention device according to claim 1, wherein the whirl chamber unit includes a plurality of second whirl chamber units in which a second whirl chamber as the whirl chamber communicates with the second liquid chamber via a second rectification passage as the rectification passage and communicates with the first liquid chamber via a second communication hole as the communication hole.

* * * * *